United States Patent [19]

Bertram et al.

[11] Patent Number: 4,791,327

[45] Date of Patent: Dec. 13, 1988

[54] DRIVE MECHANISM FOR A DOMESTIC VIBRATION APPARATUS

[75] Inventors: Leo Bertram, Stolberg, Fed. Rep. of Germany; Hugo Schemmann, Schaesberg, Netherlands; Romuald L. Bukoschek, Klagenfurt, Austria

[73] Assignee: U.S. Philips Corp., New York, N.Y.

[21] Appl. No.: 887,151

[22] Filed: Jul. 17, 1986

[30] Foreign Application Priority Data

Aug. 6, 1985 [DE] Fed. Rep. of Germany ....... 3528114
Mar. 29, 1986 [DE] Fed. Rep. of Germany ....... 3610770

[51] Int. Cl.⁴ ..................... H02K 7/118; F16H 25/16
[52] U.S. Cl. ........................................ 310/41; 310/47; 310/80; 74/54; 74/569
[58] Field of Search ............... 74/53, 54, 569; 310/41, 310/80, 47, 50

[56] References Cited

U.S. PATENT DOCUMENTS

| | | | |
|---|---|---|---|
| 1,943,118 | 1/1934 | Holmes | 74/54 |
| 2,095,744 | 10/1937 | Hanna | 74/54 |
| 2,741,132 | 4/1956 | Goldberg | 74/54 |
| 3,076,905 | 2/1963 | Watson | 310/41 |
| 3,335,302 | 8/1967 | Van Der Linden | 310/41 |
| 3,448,308 | 6/1969 | Pervorse et al. | 310/41 |
| 3,710,155 | 1/1973 | Jullien-Davin | 310/41 |
| 3,821,567 | 6/1974 | Erwin | 310/41 |
| 3,964,357 | 6/1976 | Fetzer et al. | 74/53 |
| 3,984,710 | 10/1976 | Poel | 310/41 |
| 4,400,875 | 8/1983 | Buzzi et al. | 30/43.92 |
| 4,527,671 | 7/1985 | Ozaki | 310/41 |

FOREIGN PATENT DOCUMENTS

| | | |
|---|---|---|
| 45107 | 2/1982 | European Pat. Off. |
| 151504 | 8/1985 | European Pat. Off. |
| 2513007 | 10/1975 | Fed. Rep. of Germany |
| 3404297 | 8/1985 | Fed. Rep. of Germany |
| 872634 | 6/1942 | France |
| 419767 | 11/1934 | United Kingdom |
| 506273 | 5/1939 | United Kingdom ............ 310/41 |
| 1111368 | 4/1968 | United Kingdom ............ 310/41 |

Primary Examiner—Lawrence J. Staab
Attorney, Agent, or Firm—Ernestine C. Bartlett

[57] ABSTRACT

A drive mechanism for a domestic vibration-type apparatus is provided, in which the rotor shaft (19) of a single-phase synchronous motor drives a cam-and-follower mechanism which converts the rotary motion of the rotor into a vibratory motion, the rotor and the stator having a main field direction (22) and (16), respectively. The longitudinal axis of the mirror-symmetrical cam extends at an angle to the main field direction (22) of the rotor. Rollers (31, 31a) which follow the cam (21) are arranged on a pivotal arm which is pivot about its central portion and a vibratory part (39) to be driven is arranged on the driving end (35) of this pivotal arm. As they cooperate with the cam the rollers are constantly in contact with the cam profile. At the end of the transmission path, which exhibits backlash, vibratory part (39) cooperates with a spring (38) which urges one of the rollers against the cam, causing the position of the cam relative to the direction of magnetization of the rotor to be changed so that the rotor is forced out of a position in which the direction of magnetization of the rotor and the main field direction of the rotor extend parallel to each other, by means of the spring (38), preferably in the positive direction. In this parallel position the vibratory part (39) is situated near of its reversal point. To obtain a further noise reduction a unidirectional blocking device is included.

16 Claims, 4 Drawing Sheets

DRIVE MECHANISM FOR A DOMESTIC VIBRATION APPARATUS

FIELD OF THE INVENTION

The invention relates to a drive mechanism for a domestic vibration apparatus, such as a dry-shaver or a message device, in which the rotor shaft of a single-phase synchronous motor drives a cam-and-follower mechanism which converts the rotary motion produced by the motor into a vibratory motion, the rotor of the motor having a main direction of magnetization, the stator having a main field direction and the longitudinal axis of the mirror-symmetrical cam extending at an angle to the main direction of magnetization of the rotor, and in which cam-follower rollers are mounted on a driven end of a pivotal arm which is pivotable about a central portion and a vibratory part to be driven is arranged in the driving end of said pivotal arm, the cam-follower rollers being constantly in rolling contact with the cam profile.

BACKGROUND OF THE INVENTION

U.S. Pat. No. 3,984,710 which corresponds to DE-OS No. 25 13 007 describes a starting aid for a single-phase synchronous motor in which pressure rollers are urged against a cam from opposite directions and are arranged on slides so as to be movable towards and away from one another. This mechanism constitutes an additional starting aid and has no function in the actual drive system. By means of the spring-loaded pressure rollers the cam rotates the rotor of a single-phase synchronous motor after de-energization of the stator in such a way that starting is always quaranteed, even in the case of a high friction or, in other words, in such a way that the main direction of magnetization of the rotor is rotated relative to the main stator-field direction in such a way that the two directions make an angle with one another. This is because the motor cannot be started if the two field directions coincide.

U.S. Pat. No. 4,400,875 which corresponds to EP-OS No. 45 107 describes a vibration-type dry-shaver driven by means of a rotary motor. Two cam discs are arranged on the rotor shaft of this motor perpendicularly to one another and these cam discs are each followed with a roller to drive the cutter of the dry-shaver via an articulated lever system. This lever system is vulnerable because its parts are articulated to one another by means of integral hinges. Moreover, two cams arranged above each other on the motor shaft lead to a larger height, which is in conflict with the requirement to minimize the height of the apparatus. Another construction employing a rotary motor and a crank drive produces annoying noises.

Further, said U.S. Pat. No. 4,400,875 also describes a cam mechanism in which the cam has the shape of an equilateral triangle having three identical convexly curved sides, the vibratory motion being produced by the circumferential faces of the cam. The motion is transmitted by means of a U-shaped yoke having parallel limbs which extend on opposite sides of the cam. The cam profile is such that the distance between two arbitrary parallel lines tangent to the profile is constant. Such a device is known as a constant-diameter mechanism. Thus, as the cam rotates, the contact between the cam and yoke is constantly maintained within the parallel edges of the U-shaped yoke. It has been found that such a constant-diameter mechanism presents substantial problems with respect to tolerances, jamming and noise. The same applies to a double contact mechanism as described in U.S. Pat. No. 2,741,132.

Further it is known from French Patent Specification No. 872,634 in a machine tool comprising a cam-and-follower system to urge the cam-follower arm against the cam by means of a spring. The function of this spring is to maintain a steady contact between the arm and the cam under dynamic conditions. A similar construction of vibratory apparatus driven by synchronous motors is known from German Patent Application P No. 34 04 297.0 (PHD 84-022). The spring used in this construction serves to maintain the contact between the cam and a roller also under dynamic conditions and, in addition, to rotate the rotor into such a rest position that the main direction of magnetization of the rotor does not coincide with the main statorfield direction. For vibration apparatus this construction has the disadvantage that the large spring force necessary to maintain the contact between the roller and cam gives rise to substantial frictional losses in the vibratory system. These frictional losses consume a part of the motor power.

Further, it is also found that such vibratory systems produce annoying noises. A considerable part of such noises is produced by mechanical tolerances in the transmission path. These tolerances, which are partly inevitable, lead to uncontrolled cutter movements attended with noise.

It is known to combat noise by the use of constructions without backlash. This is possible, for example, if the fork mounted on the cutter is clamped around the pivotal-arm lever. The pressure spring employed in the construction in accordance with French Patent Specification No. 872,634 also serves to eliminate backlash.

Finally, German Patent Application P No. 34 04 27 PHD84024 describes a device comprising two rollers which are arranged on a pivotal arm and which cooperate with a mirror-symmetrical cam driven by a synchronous motor.

Such a construction does not require a spring in order to maintain the contact between the rollers and the cam. Losses in the vibratory system are then reduced accordingly. However, this does not solve the starting and noise problems.

SUMMARY OF THE INVENTION

It is the object of the invention to provide a drive mechanism of the type defined in the opening paragraph, comprising two rollers and one cam, which although of simple construction guarantees a correct starting and at the same time produces less noise.

This object is achieved in that at the end of the transmission path which exhibits backlash, a compensation spring acts on the vibratory part to urge one of the cam-follower rollers against the cam, causing the position of the cam relative to the direction of magnetization of the rotor to be changed in such a way that in the case of a parallel orientation of the direction of magnetization of the rotor and the main stator-field direction, the rotor is forced out of the parallel position by means of the spring and further in that the vibratory part is situated in the proximity of a reversal point in the case of this parallel position. Suitably, the spring should rotate the rotor out of the parallel position in the positive direction. The positive direction of rotation is the direction in which the torque exerted on the rotor by the stator current becomes zero before the magnetic detent torque has become zero when the stator coils are not energized and which leads to a stable rest position. In the present case the detent torque assist the spring action in the parallel position, enabling a weaker spring to be employed.

As a result of the absence of a pressure spring which acts on the rollers to maintain the contact with the cam, the full motor power is available for driving the vibratory part. The spring which acts on the vibratory part improves the starting performance of the motor because it urges the rotor out of the position in which the direction of magnetization of the rotor and the main direction of the stator field are parallel. Finally, the spring provides a compensation for backlash, which results in a substantial noise reduction.

In a further embodiment of the invention the pressure exerted by the compensation spring is dimensioned in such a way that for the frictional load presented by the vibratory-system and spring is just capable of rotating the rotor out of the position in which the direction of magnetization of the rotor and the main direction of the stator field are oriented in parallel, preferably in the positive direction. As a result of this, the spring may be comparatively weak, thereby minimizing mechanical losses in the pivotal-lever system.

In a further embodiment of the invention the cam-follower rollers have elastic surfaces. Suitably, the roller surfaces are made of an elastomeric material. Such elastic surfaces provide tolerance compensation and a steadier motion.

It is found that the noise produced during operation of apparatus driven by single-phase synchronous motors depends to a varying degree on the direction of rotation of the motor. In some cases only the pitch of the noise is different. However, there are also cases in which the noise in one direction of rotation is substantially louder and more unpleasant than in the other direction of rotation. This may be annoying to the user and may ultimately lead to a negative opinion on or even a complete rejection of the apparatus.

The different noises may be dependent on a motor behaviour which depends on the direction of rotation. In view of this, asymmetries require special attention in the conversion of rotary movements into vibratory movements.

In a further suitable embodiment of the invention comprising the compensation spring, a unidirectional blocking device is therefore arranged in the transmission path between the vibratory part and the cam and by means of said unidirectional blocking device the rotor is forced to rotate in the direction in which noise and/or undesired vibrations produced during operation are minimized.

This ensures that the motor is always started in the direction of rotation in which noise and undesired vibrations are minimal, so that the user always has the same impression of the noise level and the overall behaviour during operation. Therefore, this can no longer raise any doubt as to the quality of the apparatus.

In a further embodiment of the invention the single-phase synchronous motor with its transmission path to the load is constructed in such a way that operational noise is minimized in the direction of rotation in which the torque exerted on the rotor by the stator current becomes zero before the magnetic detent torque has become zero when the stator coils are not energized and in which a stable rest position is obtained and the rotor is forced to rotate in said positive direction by means of a uni-directional blocking device.

By providing this preferential direction of rotation and inhibiting rotation in the opposite direction a uniform noise level is obtained, which is more favourable particularly in comparison with the vibrations and noises produced by an oscillating-armature drive system. In addition, the starting noise is reduced.

Mechanical unidirectional blocking devices are known per se, for example from GB-PS No. 419,767. In this uni-directional blocking device a frictionally coupled blocking lever which is pivotally mounted on the housing experiences a radial deflection which depends on the direction of rotation of the motor, which causes the lever to be pressed against or away from a blocking projection, thereby directly inhibiting rotation of the rotor in the undesired direction. In principle, such a construction may be used for blocking the undesired direction of rotation. However, if the motor has a tendency to start in the undesired direction of rotation, the starting noise will be very annoying as a result of this direct blocking.

Therefore, in a further embodiment of the invention, the unidirectional blocking device in said drive mechanism comprising two rollers and one cam comprises a resilient blocking element which exerts pressure on a radial end surface of one of the cam-follower rollers, the relevant cam-follower roller being provided with a blocking projection against which a blocking hook abuts in the undesired direction of rotation to block the motor indirectly. In particular, in a further embodiment of the invention, the blocking element is an injection-moulded plastic part connected to the pivotal arm carrying the cam follower roller and the injection-moulded plastics part between the location where it is connected to the lever arm and the blocking hook which is urged against the radial end surface of the cam-follower roller is constructed as a plastic spring, the blocking hook co-operating with a recess in the radial end surface of the cam-follower roller. The recess is formed in such a way that in the desired direction of rotation of the cam-follower roller, the blocking hook can freely leave the recess and in the undesired direction of rotation said hook abuts against the blocking projection.

The cam-follower roller which can be blocked then forms an element in the system of transmission elements, but as it rotates it does not transmit any forces to the part to be driven, the rotation merely ensuring a smooth cooperation between the cam and the cam follower or pivotal arm. The unidirectional blocking device acts outside the actual force transmission path and therefore its influence on the single-phase synchronous motor is minimal because it causes an increase in friction and does not provide a direct blocking, so that a minimal noise is produced.

In a further embodiment of the invention the central axis of the stator lamination core of the motor coincides with the central axis of the drive end portion of the pivotal arm in the central position of the vibratory part. This construction leads to an apparatus of very small width, which is convenient to handle.

In a further embodiment of the invention:

(a) the movement impressed on the pivotal arm by the first roller, relative to the movement impressed on the pivotal arm by the second roller, is taken off the cam geometrically shifted by a number of degrees of rotation of the cam equal to $\alpha_0 = 360°/2n$ or an odd multiple thereof, n being the multiplication factor of the oscillation frequency of the rollers and the vibratory part relative to the angular frequency of the cam;

(b) the excursion impressed on the pivotal arm by the rollers depends on the angle of rotation $\alpha$ of the cam to the same extent for both rollers; and (c) allowance being made for the roller diameter, oscillation amplitude, oscillation waveform and the average distance between the cam axis and roller axis, the cam is dimensioned in such a way that the rollers experience a periodic excursion ($x_1$ and $x_2$ respectively) which depends on the angle of rotation $\alpha$ of the cam, the fundamental frequency of the oscillation being n times the angular frequency of the cam and the symmetry requirement for the excursions being:

$$x_1 = -x_2$$

with $$x_1 = f(\alpha)$$

and $$x_2 = f(\alpha \pm \alpha_0)$$

$$\alpha_0 = (360°/2n)\cdot(2\mu+1) \quad \mu = 0, 1, 2, \ldots$$

n is preferably 2, or 4, 8 and $\alpha_0$ is the angular spacing of the two rollers 31, 31a.

In this drive mechanism the rollers ensure that the contact between the cam and the rollers is maintained continuously, one roller preventing the other roller from losing contact.

In a further embodiment of the invention:

(d) the two rollers have the same diameter;

(e) the distance between each of the two roller axes and the cam axis is the same in the center position of the rollers; and (f) the connecting lines between the two rollers axes and the cam axis in the center position of the rollers make a geometrical angle of $\alpha_0 = 360°/2n$ or an odd multiple thereof $(2\mu+1)$ with each other, n being the frequency multiplication factor.

In a further embodiment of the invention, the connection between the pivotal arm and tne spindle of one of the two or both rollers is elastic, and the planes of oscillation of the pivotal arm and the rollers preferably coincide. This may lead to a further reduction of the noise produced during operation.

In a further embodiment of the invention, the connecting line between the pivotal center, and the roller center and the connecting lines between the roller center and the cam axis extend perpendicularly to each other when the angle $\alpha_0 \neq 180°$. In this case the path through which the roller centre is pivoted deviates only slightly from a linearly oscillating path.

BRIEF DESCRIPTION OF THE DRAWINGS

An embodiment of the invention will now be described in more detail, by way of example, with reference to the accompanying drawings where.

DETAILED DESCRIPTION OF PREFERRED EMBODIMENT

Figures 1, 5, 6:
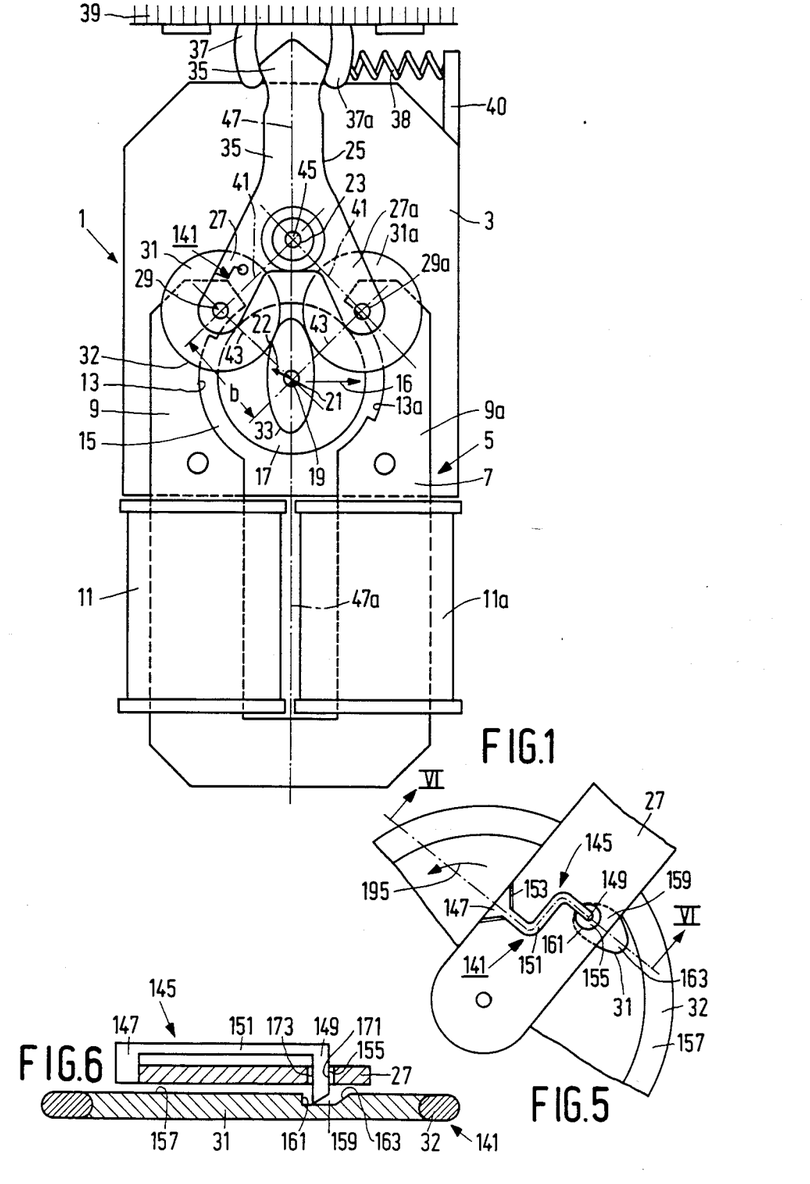
FIG. 1 shows a vibrator-type shaver comprising a single-phase synchronous drive motor and a cam-and-follower mechanism comprising a revolving cam and two cam-follower rollers in the center position of the mechanism, a compensation spring acting against one of the arms which are in contact with the pivotal arm in the direction of movement of the vibratory part and a unidirectional blocking device cooperating with one of the cam-follower rollers.
FIG. 5 is of the unidirectional blocking device and FIG. 6 is enlarged sectional view an enlarged-scale view and of the unidirectional blocking device taken along line IV—IV of FIG. 5.

FIG. 1 shows a vibrator-type shaver comprising a single-phase synchronous motor 5 secured to a base plate 3. The single-phase synchronous motor a U-shaped lamination core 7 with two limbs 9 and 9a. Tne limbs 9 and 9a carry exciter coils 11 and 11a. At the free ends of the limbs 9, 9a pole pieces 13, 13a are formed in such a way that a stator bore 15 is obtained. The main direction of the stator field is indicated by the reference numeral 16. A permanent-magnet rotor 17 rotates in the stator bore 15 and the shaft 19 of this rotor carries a cam 21. In the example shown in FIG. 1, the cam 21 has an oblong slightly elliptical mirror-symmetrical shape. The direction of magnetization of the rotor 17 is indicated by the reference numeral 22.

A spindle 23 about which a pivotal arm 25 is pivotable is mounted on the base plate 3. The arm 25 bifurcates into two arm portions 27, 27a at the driven side. Rollers 31, 31a are mounted on the free ends of the driven arm portions by means of spindles 29, 29a. The rollers 31 and 31a follow the profile 33 of the cam 21 and are constantly urged onto this profile. The driving end 35 of the lever arm 25 cooperates with fork limbs 37, 37a of a cutter 39. A compensation spring 38, which bears against the apparatus housing represented by the abutment 40, acts against one of the fork limbs 37, 37a. One of the two or both driven arm portions 27 and 27a may be made elastic in a manner not shown. Alternatively, the spindles 29 and 29a may be supported elastically or the circumferential surface of one or both rollers 31, 31a may be provided with an elastic coating so as to preclude jamming.

In the embodiment shown in FIG. 1 the connecting lines 43 between the motor/cam axis 19 and the roller axes 29, 29a enclose an angle $\alpha_0$ of 90° with one another, in the center position shown. This situation is obtained when $$\alpha_0 = 360°(2\mu + 1/2n)$$

where n=2 and $\mu=0$ (frequency doubling).

Figure 2A:
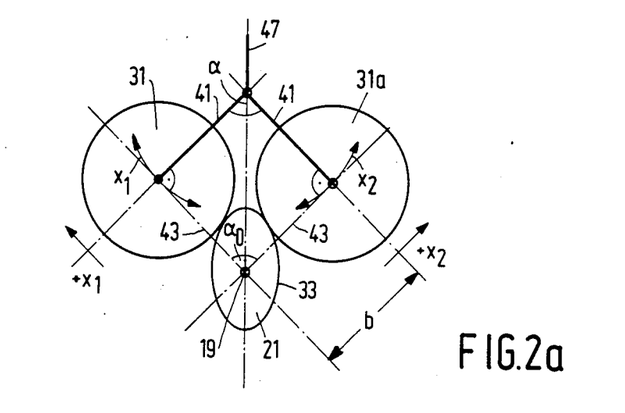
FIGS. 2a to 2c show three different cam positions relative to the rollers in the mechanism of FIG. 1 which comprises an oblong slightly elliptic cam (n=2), FIG. 2a showing the system in the center position, FIG. 2b showing the left-hand end position and FIG. 2c the right-hand end position.
Figure 2B:
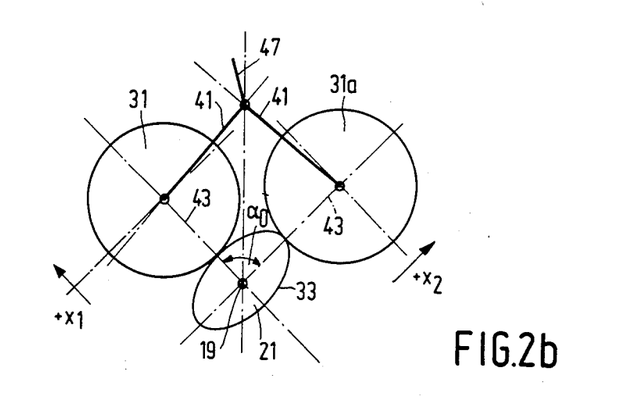
Figure 2C:
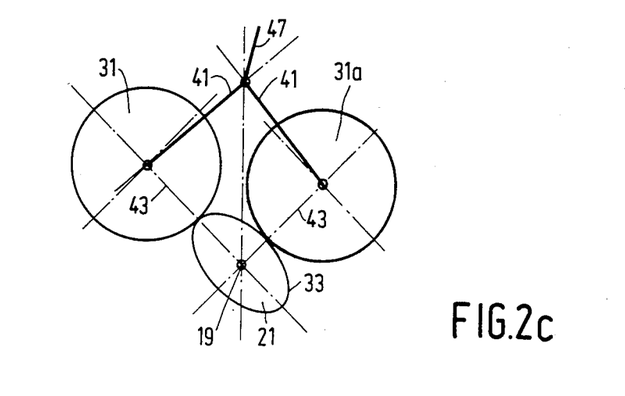

The phase shift of the excursions $x_1$ and $x_2$ (FIG. 2a) depends on the angle $\alpha_0$. For the function in accordance with the invention it is important that $x_1$ is always equal to $-x_2$, and $x_1 = f(\alpha)$ and $x_2 = f(\alpha \pm \alpha_0)$.

In FIGS. 1 and 2a to c: $n = 2$ and $\mu = 0$.

When $x_1 = \sin 2\alpha$ and $\alpha_0 = 90°$ this yields: $x_2 = \sin 2(\alpha + 90°) = -\sin 2\alpha$. Consequently, $x_2 = -x_1$.

Figure 3A:
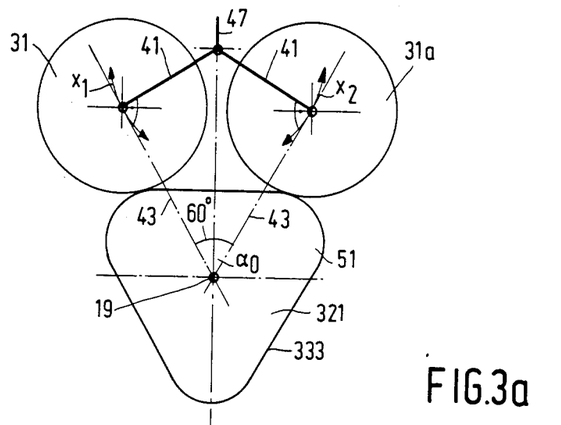
FIGS. 3a to c show the mechanism of FIG. 1, comprising a substantially triangular cam (n=3) in three different cam positions, FIG. 3a and 3b showing the center position and FIG. 3c showing the left-hand end position.
Figure 3B:
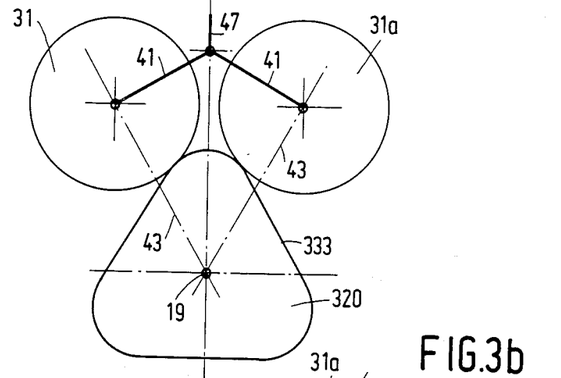
Figure 3C:
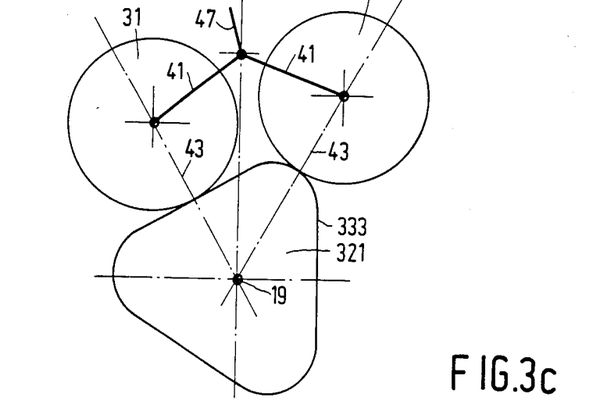
Figure 4A:
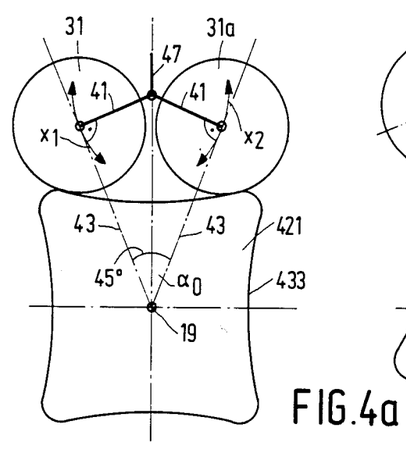
FIGS. 4a to d show the mechanism of FIG. 1, comprising a substantially rectangular cam (n=0): for different cam positions (a-d) are shown, FIGS. 4a and 4d showing the center position, FIG. 4b the left-handed end position, and FIG. 4c the right-hand end position; all said cams complying with the above symmetry requirements.
Figure 4B:
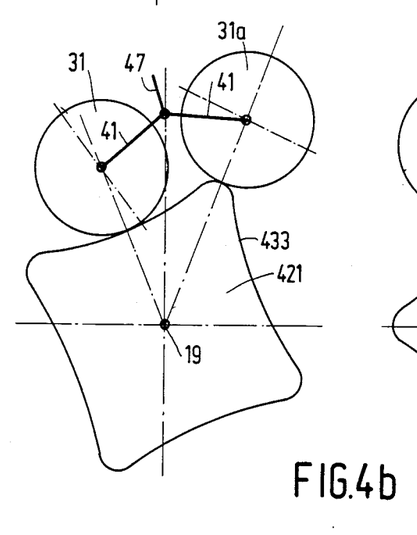
Figure 4C:
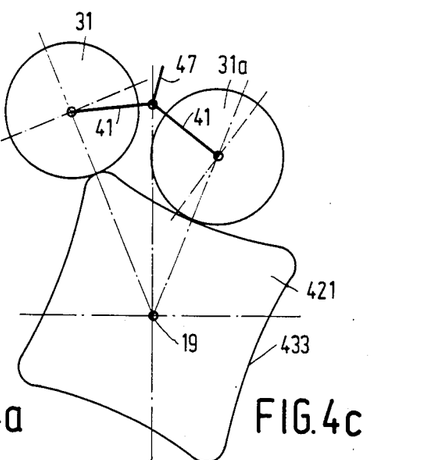
Figure 4D:
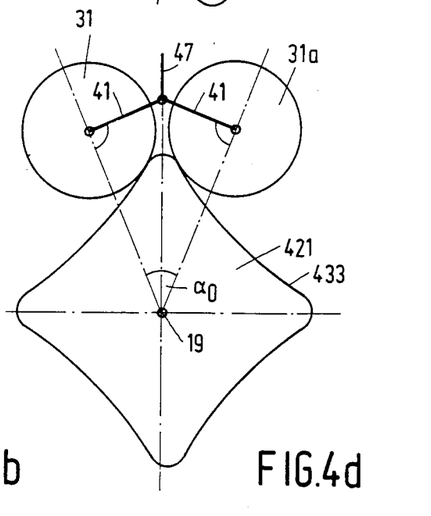

Similarly, in FIG. 3a to c: $n = 3$ and $\mu = 0$. When $x_1 = \sin 3\alpha$ and $\alpha_0 = 60°$, this yields: $x_2 = \sin 3(\alpha + 60°) = -\sin 3\alpha$. Consequently, $x_2 = -x_1$.

Similarly, in FIGS. 4a to d: $n = 4$ and $\mu = 0$. When $x_1 = \sin 4\alpha$ and $\alpha_0 = 45°$, this yields: $x_2 = \sin 4(\alpha + 45°) = -\sin 4\alpha$. Consequently, $x_2 = -x_1$.

The above functions for $x_1$ and $x_2$ may also contain harmonic frequencies higher than the fundamental oscillation frequency provided that the above symmetry requirement is met. Since the movement impressed on the rollers 31 and 31a by the cam 21, which movement originally starts in the center position of the rollers 31, 31a, is based on a linearly oscillating motion in the direction of the connecting lines 43 between the cam and roller axes, the center 41 of the pivotal spindle 23 of the pivotal arm 25 is preferably the center of a circle which is substantially tangent to the two roller spindles 29, 29a in the center positions of the rollers 31, 31a. This circular path should as closely as possible approximate the original linearly oscillating roller path. For this purpose it is advantageous if the pivotal-arm axes 23 and the central axis 47 of the driving portion of the pivotal arm respectively and the central axis 47a of the motor lamination core constitute bisectors for the angles between the connecting lines 43 of tne roller axes 29, 29a and the cam axis 19, said central axis 47 extending through the cam axis 19. In the center position of the pivotal arm 25 the connecting lines 41 between the pivotal-arm axis 23 and the roller axes 29, 29a and the connecting lines 43 between the cam axis 19 and the roller axes 29, 29a preferably extend perpendicularly to each other. Departures from the linear path lead to deformation. However, allowance can be made for this in the design of the cam profile. Another possibility of obtaining a simultaneous and uniform contact of the rollers with the cam is to ensure that the deviations from the ideal linear path are equal in the positive and the negative direction. Tolerances and residual noise can be reduced by the use of rollers which have elastic surfaces or which are wholly elastic. In this respect it is advantageous if one of the two or both driven arm portions 27, 27a are elastic and exert a slight pressure on the cam 21.

Instead of rigidly coupling the pivotal levers to each other they may be mounted separately on the spindle 23, the contact between the rollers 31, 31a and the cam 21 being provided by a highly progressive tension spring between the drive arm portions 27 and 27a.

A correct cam profile 33 which complies with the above symmetry requirements is prerequisite for a correct operation of the drive mechanism. The cam profile 33 may be determined as follows.

It is assumed that:
1. The roller diameter $= R_0$.
2. The average distance between the cam axis 19 and the roller axes 29, 29a is b.
3. The equation describing the dependence of the roller excursion on the cam rotation is $x = f(\alpha)$, the symmetry requirement $x_1 = -x_2$ being met in such a way that the excursion recurs with an inverted sign after half a period, so that said equation contains only odd harmonics.

About the cam axis 19 a circle is drawn, whose radius is equal to the average distance b between the cam axis 19 and the roller axes 29, 29a. The positive and negative excursions associated with the relevant angles in conformity with the requirement $x = f(\alpha)$ are plotted on the circumference of this circle in a radial direction. The corresponding radii are then prolonged or shortened by the magnitude of the excursion corresponding to the relevant angle. Circles having radii equal to the roller radius are drawn close to one another around the curve thus obtained. These circles bound portions of the circle originally drawn about the cam axis. After the curve has been encircled completely the desired cam profile is obtained. Preferably, the excursion is a sinusoidal function of the angle of rotation $$x = a \sin n\alpha.$$

where a is the amplitude of the roller excursion, which also dictates the amplitude of the cutter oscillation, allowance being made for the lever ratios which depends on the construction.

In the situation illustrated in FIG. 3, where $n = 3$, $\mu = 0$, an angle of rotation $\alpha_0$ of 60° is obtained for the roller spindle. In the situation $n = 3$, $\mu = 1$ which is not shown in the drawings, the same cam profile yields an angle $\alpha_0$ of 180°. This arrangement, which comprises a substantially triangular cam, resembles a triangular convexly curved cam. If differs from a constant-diameter cam in that the corners of the triangle are rounded more strongly. The constant-diameter profile generally does not comply with the symmetry requirement, so that the expression for the excursion as a function of the rotation contains only odd harmonics of the fundamental frequency of the excursion period. In addition, the tangents of the roller drive at the contact point are parallel in a few positions only and the distance between the contact points of the rollers with the cam circumference 333 is not constant.

When the symmetry requirement $x_2 = -x_1$ is met it follows that this ensures that the rollers 31, 31a are in contact with the surface 333 of the triangular cam 321 both in the two possible centre positions (FIGS. 3a and 3b) of the pivotal arm 25 and in the case of an excursion of the pivotal arm 25 relative to the central axis.

In the embodiment shown in FIG. 4, where $n = 4$ and $\mu = 0$, a substantially rectangular cam 421 is obtained. The angle $\alpha_0$ between the rollers 31, 31a is then 45° for $\mu = 0$. FIG. 4a shows that in this case the lines 41 between the pivotal center 45 and the roller center 29 and the connecting lines 43 between the roller center 29 and the cam axis 19 extend perpendicularly to one another in the center position. Both in the center position of the pivotal arm 25 (FIGS. 4a and 4b) and in the other pivoted positions (FIGS. 4b and 4c) it is ensured that the rollers 31, 31a are in contact with the surface 433 of the rectangular cam. The frequency multiplication now attainable can be obtained by purely mechanical means, using a very compact construction. This is of particular advantage in miniaturization.

In the embodiment shown in FIG. 1 a unidirectional blocking device 141 is arranged between the driving arm portion 27 and the roller 31, which device is shown to an enlarged scale in FIGS. 5 and 6. The unidirectional blocking device 141 acts between the arm 27 and the roller 31; it comprises an injection moulded Z-shaped plastics blocking element 145, comprising a mounting pin 147, a blocking hook 149 and a resilient bridge 151 interconnecting these portions. The mounting pin 147 is capatively mounted in a dovetail hole 153 in the arm 27. The blocking hook 149 extends through a hole 155 in the arm 27 in such a way that it freely movable. The resilient bridge 151 constantly urges the blocking hook 149 against the radial end surface 157 of the roller 31.

In its radial end surface 157 the cam-follower roller has a recess 159 which adjoins the end surface 157 with an oblique portion 173 in the desired direction of rotation and which has an abutment surface 161 in the opposite direction of rotation.

If the cam 21 rotates the roller 31 in the desired direction of rotation (arrow 195) the unidirectional blocking device 141 is inoperative. Conversely, if the cam 21 rotates the roller 31 in a direction opposite to the desired direction of rotation (195) the hook 149 abuts against the abutment surface 161 and the roller 131 is stopped. As a result of this, tne direction of rotation of the motor is reversed.

What is claimed is:

1. A drive mechanism for a domestic vibration apparatus which comprises a transmission path to a load having a vibration part, the drive mechanism including a rotor shaft of a single-phase synchronous motor which drives a cam-and-follower mechanism having a mirror-symmetrical cam which converts the rotary motion produced by the motor into a vibratory motion, the rotor of the motor having a magnetic detent torque and a main direction of magnetization, the stator comprising exciter coils capable of generating a current, the stator having a main field direction and the longitudinal axis of the mirror-symmetrical cam extending at an angle to the main direction of magnetization of the rotor, and in which cam follower rollers are mounted on a driven end of a pivotal arm which is pivotal about a central pivotpoint and a vibratory part to be driven between reversal points is aranged on a driving end of said pivotal arm, the cam-follower rollers being constantly in rolling contact with the cam profile, wherein at the end of the transmission path which exhibits backlash a compensation spring (38) acts on the vibratory part (39) to urge one of the cam-follower rollers (31, 31a) against the cam (21), causing the position of the cam (21) relative to the direction of a magnetization of the rotor to be changed in such a way that in the case of a parallel orientation of the direction (22) of magnetization of the rotor and the main stator-field direction (16), the rotor (17) is forced out of a parallel position by means of the spring (38), into a positive direction, said positive direction being the direction in which a torque exerted on the rotor (17) by the stator current becomes zero before the magnetic detent torque has become zero when the stator coils (11, 11a) are not energized whereby the rotor is rotated into a stable rest position, the vibratory part (39) being situated in the proximity of a reversal point in the case of said parallel orientation.

2. A drive mechanism as claimed in claim 1, wherein the pressure exerted by the compensation spring (38) is dimensioned in such a way that for the frictional load presented by the vibratory system part said spring is just capable of rotating the rotor (17) out of the position in which the direction (22) of magnetization of the rotor and the main stator-field direction (16) are oriented in parallel, in the positive direction.

3. A drive mechanism as claimed in claim 1, characterized in that the cam-follower rollers (31, 31a) have elastic surfaces (32).

4. A drive mechanism as claimed in claim 3, wherein the roller surfaces (32) are made of an elastomeric material.

5. A drive mechanism as claimed in claim 1, wherein a unidirectional blocking device (141) is arranged in the transmission path between the vibratory part (39) and the cam (21) and by means of said unidirectional blocking device (41) the rotor (17) is forced to rotate in the direction in which the noise and/or undesired vibrations are minimized.

6. A drive mechanism as claimed in claim 1 including a unidirectional blocking device (141), constituted by a resilient Z-shaped blocking element (145) which exerts pressure on a radial end surface (157) of one of the cam-follower rollers (31), the relevant cam-follower roller (31) being provided with a blocking surface (161) against which a blocking hook (149) abuts in the undesired direction of rotation.

7. A drive mechanism as claimed in claim 6, wherein the blocking element (145) is an injection-moulded plastic part connected to the pivotal arm (27) carrying the cam-follower roller (31) and the injection-moulded plastic part between the location (153) where it is connected to the lever arm (27) and the blocking hook (149) which is urged against the radial end surface (157) of the cam-follower roller (31) is constructed as a Z-shaped plastic pin (151), the blocking hook (149) cooperating with a recess (159) in the radial end surface (157) of the cam-follower roller (31).

8. A drive mechanism as claimed in claim 7, wherein the recess (159) is formed in such a way that in the desired direction of rotation of the cam-follower roller (31) the blocking hook (149) can freely leave the recess (159) along an inclined surface (163) and in the undesired direction of rotation said hook abuts against the blocking projection (161).

9. A drive mechanism as claimed in claim 1, wherein the motor includes a stator lamination core having a central axis (47a) which coincides with a central axis (47) of the driven end portion of the pivotal arm (25) in a center position of the vibratory part.

10. A drive mechanism as claimed in claim 9, wherein the cam-follower rollers (31, 31a) are arranged symmetrically on opposite sides of the central axis (47) through the stator lamination core (7) and the pivotal arm (25).

11. A drive mechanism as claimed in claim 1 wherein
(a) the movement impressed on the pivotal arm (25) by a first roller (31), relative to the movement impressed on the pivotal arm (25) by a second roller (31a) is taken off the cam geometrically shifted by a number of degrees of rotation of the cam (21, 321, 421) equal to $\alpha_0 = 360°/2n$ or an odd multiple thereof, n being the multiplication factor of the oscillation frequency of the rollers (31, 31a) and the vibratory part (39) relative to the angular frequency of the cam;
(b) the excursion impressed on the pivotal arm (25) by the rollers (31, 31a) depends on the angle of rotation $\alpha$ of the cam (21, 321, 421) to the same extent for both rollers (31, 31a); and
(c) allowance being made for the roller diameter, oscillation amplitude, oscillation waveform, and the average distance (b) between the cam axis (19) and the roller axis (29, 29a), the cam (21, 321, 421) is dimensioned in such a way that the rollers (31, 31a) experience a periodic excursion ($x_1$ and $x_2$ respectively) which depends on the angle of rotation $\alpha$ of the cam, the fundamental frequency of the oscillation being n times the angular frequency of the cam (21, 321, 421) and the symmetry requirement for the excursions being $$x_1 = -x_2$$

with $$x_1 = f(\alpha)$$

$$x_2 = f(\alpha + \alpha_0)$$

and $\alpha_0 = (360°/2n) \cdot (2\mu + 1)$, wherein $\mu$ = an integer; ...

n is 2, 4 or 8 and $\alpha_0$ is the angular spacing between the two rollers (31, 31a).

12. A drive mechanism as claimed in claim 1 wherein
(a) the rollers (31, 31a) have the same diameter;
(b) the distances between each of the rollers axes (29, 29a) and the cam axis (19) is the same in the center position of the rollers (31, 31a); and
(c) connecting lines (43) between the roller axes (29, 29a) and the cam axis (19) in the center position of the rollers (31, 31a) make a geometrical angle with each other of $\alpha_0 = 360°/2n$ or an odd multiple thereof represented by $(2\mu + 1)$, wherein n is the frequency multiplication factor and $\alpha$ is an integer.

13. A drive mechanism as claimed in claim 1, wherein for an angle $\alpha \neq 180°$ a connecting line (41) between the pivot point of the pivotal arm (45) and a roller center (29) and the connecting line (43) between the roller center (29) and a cam axis (19) extend perpendicularly to each other.

14. A drive mechanism as claimed in claim 1 wherein the pivotal arm includes a spindle (23) and the rollers (31, 31a) include a spindle (29, 29a) a connection between the pivotal spindle (23) and the spindle (29, 29a) of each of the two or both rollers (31, 31a) being elastic.

15. A drive mechanism as claimed in claim 1, the planes of oscillation of the pivotal arm (25) and the rollers (31, 31) coincide.

16. A drive mechanism as claimed in claim 1 wherein the pivotal arm (25) on one side of the pivot point (23) comprises a driving portion (35) adapted to cooperate with the vibratory part (39) and on the other side of the pivot point, (23) comprises driven arm portions (27, 27a) which are pivotable relative to the driving arm portion (35) and which are spring-loaded relative to one another.

* * * * *